United States Patent
Na

(10) Patent No.: US 7,633,494 B2
(45) Date of Patent: Dec. 15, 2009

(54) APPARATUS AND METHOD FOR CONTROLLING DISPLAY STATE

(75) Inventor: Woon Na, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 683 days.

(21) Appl. No.: 11/267,803

(22) Filed: Nov. 4, 2005

(65) Prior Publication Data

US 2006/0098769 A1  May 11, 2006

(30) Foreign Application Priority Data

Nov. 6, 2004   (KR) ..................... 10-2004-0090136

(51) Int. Cl.
*G09G 5/00* (2006.01)
(52) U.S. Cl. .................. 345/204; 345/213; 348/536
(58) Field of Classification Search ......... 345/204–599; 375/355, 344; 341/131, 537; 348/500–548
See application file for complete search history.

(56) References Cited

U.S. PATENT DOCUMENTS

| | | | |
|---|---|---|---|
| 6,097,444 A * | 8/2000 | Nakano | 348/607 |
| 6,337,682 B1 | 1/2002 | Hwang | |
| 6,339,435 B1 * | 1/2002 | Kim | 345/690 |
| 6,340,993 B1 * | 1/2002 | Hasegawa et al. | 348/572 |
| 6,404,422 B1 | 6/2002 | Choi | 345/211 |
| 7,053,889 B2 * | 5/2006 | Kang et al. | 345/204 |
| 2006/0071936 A1 * | 4/2006 | Leyvi et al. | 345/589 |

FOREIGN PATENT DOCUMENTS

| | | |
|---|---|---|
| JP | 07-325559 | 12/1995 |
| JP | 2000-47649 | 2/2000 |
| JP | 2000-338924 | 12/2000 |
| TW | 345655 | 11/1998 |
| TW | 385425 | 3/2000 |

OTHER PUBLICATIONS

Search Report dated Feb. 9, 2009 issued in corresponding Taiwan Application No. TW094138378.

* cited by examiner

*Primary Examiner*—Regina Liang
(74) *Attorney, Agent, or Firm*—Mills & Onello, LLP

(57) ABSTRACT

In a display state control apparatus for automatically changing the frequency and the phase of a sampling clock signal according to changes in the phase and frequency of an input signal, and in a display state control method therefor, an optimal display state is maintained by automatically changing the frequency and phase of a sampling clock signal used to sample an input signal according to changes in the input signal. In this manner, user interaction is not required for generating the optimal display control signal.

7 Claims, 4 Drawing Sheets

FIG. 5

HORIZONTAL DATA COUNT

| | 100 | 101 | 102 | 103 | 104 | 105 | 106 | 107 | 108 | 109 | 110 | 111 | 112 | 113 | 114 |
|---|---|---|---|---|---|---|---|---|---|---|---|---|---|---|---|
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |
| 1 | 97 | 105 | 120 | 140 | 135 | 130 | 133 | 129 | 128 | 125 | 135 | 129 | 132 | 33 | 29 |
| 2 | 99 | 103 | 121 | 145 | 130 | 140 | 130 | 125 | 130 | 143 | 135 | 150 | 128 | 30 | 15 |
| 3 | 99 | 104 | 125 | 144 | 136 | 140 | 130 | 115 | 145 | 130 | 140 | 131 | 140 | 30 | 10 |
| 4 | 98 | 108 | 130 | 143 | 135 | 150 | 128 | 120 | 145 | 135 | 120 | 130 | 115 | 30 | 43 |
| 5 | 101 | 108 | 128 | 145 | 134 | 147 | 129 | 118 | 115 | 145 | 135 | 120 | 131 | 40 | 30 |
| 6 | 99 | 106 | 129 | 144 | 130 | 144 | 130 | 120 | 120 | 130 | 143 | 135 | 150 | 28 | 10 |
| 7 | 95 | 108 | 131 | 140 | 130 | 145 | 135 | 120 | 130 | 115 | 145 | 130 | 140 | 20 | 30 |
| 8 | 96 | 107 | 129 | 145 | 137 | 145 | 132 | 128 | 130 | 115 | 145 | 130 | 143 | 35 | 50 |
| 9 | 97 | 110 | 130 | 143 | 135 | 144 | 130 | 125 | 130 | 143 | 130 | 115 | 145 | 30 | 40 |
| 10 | 99 | 109 | 125 | 143 | 135 | 149 | 131 | 125 | 131 | 131 | 140 | 130 | 143 | 135 | 150 |
| | ⋮ | ⋮ | ⋮ | ⋮ | ⋮ | ⋮ | ⋮ | ⋮ | ⋮ | ⋮ | ⋮ | ⋮ | ⋮ | ⋮ | |

VERTICAL LINE COUNT

APPARATUS AND METHOD FOR CONTROLLING DISPLAY STATE

This application claims the priority of Korean Patent Application No. 10-2004-0090136, filed on Nov. 6, 2004, in the Korean Intellectual Property Office, the disclosure of which is incorporated herein in its entirety by reference.

BACKGROUND OF THE INVENTION

1. Field of the Invention

The present invention relates to a flat panel display (FPD) device, and more particularly, to an apparatus for automatically controlling the frequency and phase of a sampling clock signal of a flat panel display (FPD) system.

2. Description of the Related Art

A monitor with a TFT-LCD (Thin Film Transistor-Liquid Crystal Display) or a flat panel display (FPD), such as a projection TV, receives graphic signals or video signals input from external sources using a sampling clock signal. To correctly receive an input signal, the frequency and phase of the sampling clock signal should be equal to those of the input signal. If an input graphics/video signal and the sampling clock signal do not have the same frequency and phase, the picture quality of a reproduced image can be adversely affected.

FIG. 1 is a block diagram of a conventional apparatus for controlling the display state of a FPD.

Referring to FIG. 1, an analog-digital converter-phase locked loop (ADC-PLL) 101, a digital signal processor 103, and a controller 105 are used to control the display states of the FPD.

The ADC-PLL 101 includes an analog-digital converter (ADC) (not shown) and a phase locked loop (PLL) (not shown). The PLL generates a sampling clock signal, the frequency and phase of which change in response to a first control signal C1 received from the controller 105. The ADC converts an input analog signal into a digital data signal D1 using the sampling clock signal and outputs the digital data signal D1 to the digital signal processor 103.

The digital signal processor 103 performs image processing such as scaling, gamma correction, and dithering, on the digital data signal D1, according to a second control signal C2 received from the controller 105.

The controller 105 receives a display control signal generated by the manipulation of keys by a user and outputs the first control signal C1 and the second control signal C2.

If the sampling clock signal does not change when the phase and frequency of an analog graphic/video signal input to the ADC changes, the picture quality of a corresponding reproduced image can be adversely affected, as described above. In the conventional technique, by appropriately changing the frequency and phase of a sampling clock signal output by the PLL and sampling an input signal using the changed sampling clock signal, such picture quality deterioration can be mitigated. However, in the configuration shown in FIG. 1, a user must directly generate a display control signal to control the display state when watching a screen, which is inconvenient.

SUMMARY OF THE INVENTION

The present invention provides an apparatus for controlling a display state by automatically changing the frequency and phase of a sampling clock signal according to changes in the frequency and phase of an input signal.

The present invention also provides a method for controlling a display state by automatically changing the frequency and phase of a sampling clock signal according to changes in the frequency and phase of an input signal.

According to an aspect of the present invention, there is provided an apparatus for controlling a display state, comprising: an ADC-PLL that converts a received analog signal into a digital data signal using an internal sampling clock signal and outputting the digital data signal, in response to a first control signal and a second control signal; a digital signal processor that performs scaling, gamma correction, and dithering on the digital data signal in response to a third control signal; an auto control unit that detects the frequency and the phase of the sampling clock signal, the locations and amounts of horizontal and vertical available data included in the digital data signal, and the minimum and maximum gray levels of the horizontal and vertical available data of the digital data signal using the digital data signal; and a controller that outputs the first control signal, the second control signal, and the third control signal using information detected by the auto control unit.

In one embodiment, the ADC-PLL comprises an ADC (Analog to Digital Converter) and a PLL (Phase Locked Loop circuit), and wherein the PLL generates a sampling clock signal the frequency and phase of which change in response to the first control signal, and wherein the ADC adjusts the gain of the digital data signal when converting the received analog signal into the digital data signal in response to the second control signal.

In another embodiment, the auto control unit comprises: a first detector that detects the frequency and the phase of the sampling clock signal using the digital data signal; a second detector that detects the locations and amounts of the horizontal and vertical available data included in the digital data signal; and a third detector that detects the minimum and maximum gray levels of the horizontal and vertical available data included in the digital data signal.

In another embodiment, the first control signal is generated using output data of the first detector and the second detector and is used to change the frequency and the phase of the sampling clock signal, the second control signal is generated using output data of the third detector and is used to adjust the gain of the digital data signal, and the third control signal is generated using output data of the second detector and is used by the digital signal processor to control scaling, gamma correction, and dithering.

In another embodiment, the first detector comprises: a first detection block that detects the location of a pixel with the maximum high-frequency among pixels arranged in a column direction; a noise accumulation block that accumulates field or frame data at the location of the pixel with the maximum high-frequency; a memory that stores data detected by the first detection block and data to be accumulated by the noise accumulation block; a kernel generator block that generates a kernel signal for detecting the location of accumulated noise; and a second detection block that detects the frequency and the phase of the sampling clock signal using the accumulated field or frame data and the kernel signal.

In another embodiment, the second detector comprises: a third detection block that detects the start location and the end location of horizontal available data included in the digital data signal; a fourth detection block that detects the start location and the end location of vertical available data included in the digital data signal; a fifth detection block that detects the amount of the horizontal available data by subtracting the start location of the horizontal available data from the end location of the horizontal available data; and a sixth detection block that detects the amount of the vertical available data by subtracting the start location of the vertical available data from the end location of the vertical available data.

In another embodiment, the analog signal is a graphics data signal or a video data signal.

According to another aspect of the present invention, there is provided a method for controlling a display state, comprising: generating a sampling clock signal in response to a second control signal, and converting a received analog signal into a digital data signal using the sampling clock signal and simultaneously controlling the gain of the digital data signal in response to a first control signal; performing digital signal processing, including at least one of scaling, gamma correction, and dithering, on the digital data signal in response to a third control signal; generating a detection signal for controlling the frequency and phase of the sampling clock signal and for controlling the digital signal processing, using the digital data signal; and generating the first control signal, the second control signal and the third control signal using the detection signal.

In one embodiment, the generating of the detection signal comprises: detecting the frequency and phase of the sampling clock signal using the digital data signal; detecting the locations and amounts of horizontal and vertical available data included in the digital data signal; and detecting the maximum and minimum gray levels of the horizontal and vertical available data included in the digital data signal.

In another embodiment, the detecting of the frequency and the phase of the sampling clock signal comprises: detecting the location of a pixel with a maximum high-frequency among pixels arranged in a column direction; accumulating field or frame data at the location of the pixel having the maximum high-frequency; storing in a memory data detected during the detecting of the location of the pixel and the data accumulated during the accumulating of the field or frame data; generating a kernel signal for detecting the location of accumulated noise; and detecting the frequency and phase of the sampling clock signal using the accumulated field or frame data and the kernel signal.

In another embodiment, the detecting of the locations and amounts of the horizontal and vertical available data comprises: detecting the start location and the end location of the horizontal available data included in the digital data signal; detecting the start location and the end location of the vertical available data included in the digital data signal; subtracting the start location of the horizontal available data from the end location of the horizontal available data, thereby detecting the amount of the horizontal available data; and subtracting the start location of the vertical available data from the end location of the vertical available data, thereby detecting the amount of the vertical available data.

BRIEF DESCRIPTION OF THE DRAWINGS

The above and other features and advantages of the present invention will become more apparent by describing in detail exemplary embodiments thereof with reference to the attached drawings in which:

FIG. 5 shows an initial field (or initial frame) of a digital data signal output from an ADC-PLL of FIG. 2, in matrix form, in accordance with the present invention;

DETAILED DESCRIPTION OF THE INVENTION

Hereinafter, embodiments of the present invention will be described in detail with reference to the appended drawings. Like reference numbers refer to like components throughout the drawings.

Figure 1:
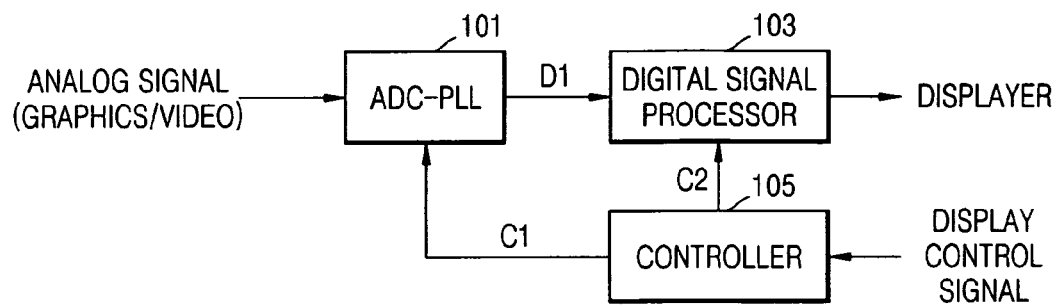
FIG. 1 is a block diagram of a conventional apparatus for controlling the display state of a flat panel display (FPD)
Figure 2:
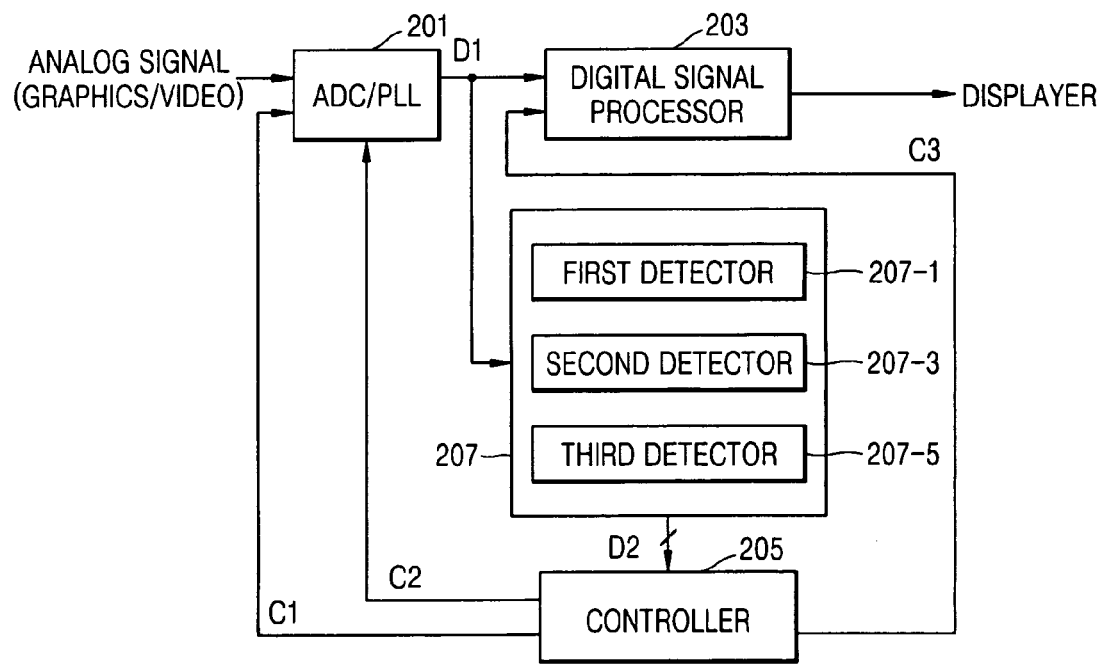
FIG. 2 is a block diagram of an apparatus for controlling the display state of a FPD, according to an embodiment of the present invention.

FIG. 2 is a block diagram of an apparatus for controlling the display state of a flat panel display (FPD), according to an embodiment of the present invention.

The display state control apparatus includes an analog-digital converter-phase locked loop (ADC-PLL) 201, a digital signal processor 203, a controller 205, and an auto control unit 207.

The ADC-PLL 201 includes an ADC (not shown) and a PLL (not shown). The PLL generates a sampling clock signal the frequency and phase of which change in response to a first control signal C1. The ADC converts an input analog signal into a digital data signal D1 using the sampling clock signal and outputs the digital data signal D1 to the digital signal processor 203, and simultaneously adjusts the gain of the digital data signal D1 in response to a second control signal C2.

The digital signal processor 203 performs image processing, such as scaling, gamma correction, and dithering on the digital data signal D1 according to a third control signal C3.

The controller 205 generates the first control signal C1, the second control signal C2, and the third control signal C3 using a detection signal D2 received from the auto control unit 207. The detection signal D2 output from the auto control unit 207 will be described in detail below, and includes information regarding the frequency and phase of the sampling clock signal, information regarding the locations and amounts of horizontal and vertical available data included in the digital data signal D1, and information regarding minimum and maximum gray levels of the horizontal and vertical available data. The horizontal and vertical available data refers to available data located respectively in the row and column directions in the digital data signal D1 when represented in matrix form. This will be described in further detail below with reference to FIG. 5.

The first control signal C1 is generated on the basis of the information regarding the frequency and phase of the sampling clock signal and the information regarding the locations and amounts of the horizontal and vertical available data included in the digital data signal D1. The first control signal C1 is used to change the frequency and phase of the sampling clock signal generated by the PLL in the ADC-PLL 201.

The second control signal C2 is generated on the basis of the information regarding the minimum and maximum gray levels of the horizontal and vertical available data in the digital data signal D1, and is used to control the gain of the digital data signal D1 in the ADC of the ADC-PLL 201.

The third control signal C3 is generated on the basis of the information regarding the locations and amounts of the horizontal and vertical available data in the digital data signal D1, and is used to control scaling, gamma correction, and dithering, etc., which are performed by the digital signal processor 203.

The auto control unit 207 includes a first detector 207-1, a second detector 207-3, and a third detector 207-5.

The first detector 207-1 detects the frequency and phase of the sampling clock signal using the digital data signal D1. The second detector 207-3 detects the locations and amounts of the horizontal and vertical available data in the digital data signal D1. The third detector 207-5 detects the minimum and maximum gray levels of the available data of the digital data signal D1.

Figure 3:
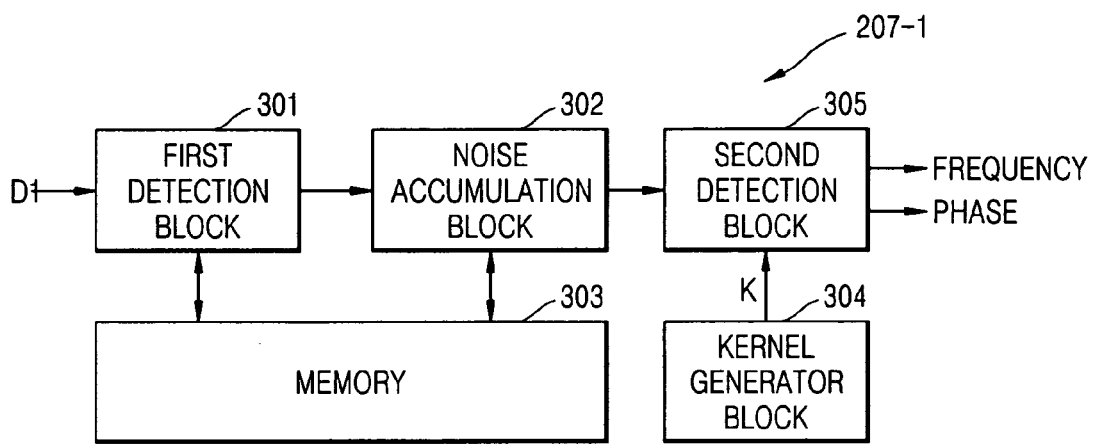
FIG. 3 is a block diagram of a first detector of the apparatus of FIG. 2, in accordance with the present invention.

FIG. 3 is a block diagram of the first detector 207-1.

Referring to FIG. 3, the first detector 207-1 includes a first detection block 301, a noise accumulation block, a memory 303, a kernel generator block 304, and a second detection block 305.

The first detection block 301 detects the location of a column pixel having a maximum high-frequency using the digital data signal D1. The noise accumulation block 302 accumulates field data or frame data of the pixel with the maximum high-frequency. The memory 303 stores the data detected by the first detection block 301 and the noise accumulation block 302. The kernel generator block 304 generates a kernel for detecting the location of accumulated noise. The second detection block 305 detects the frequency and phase of the sampling clock signal. The field data or frame data refers to a group of data that are used to create a picture to be displayed on an FPD.

Figure 4:
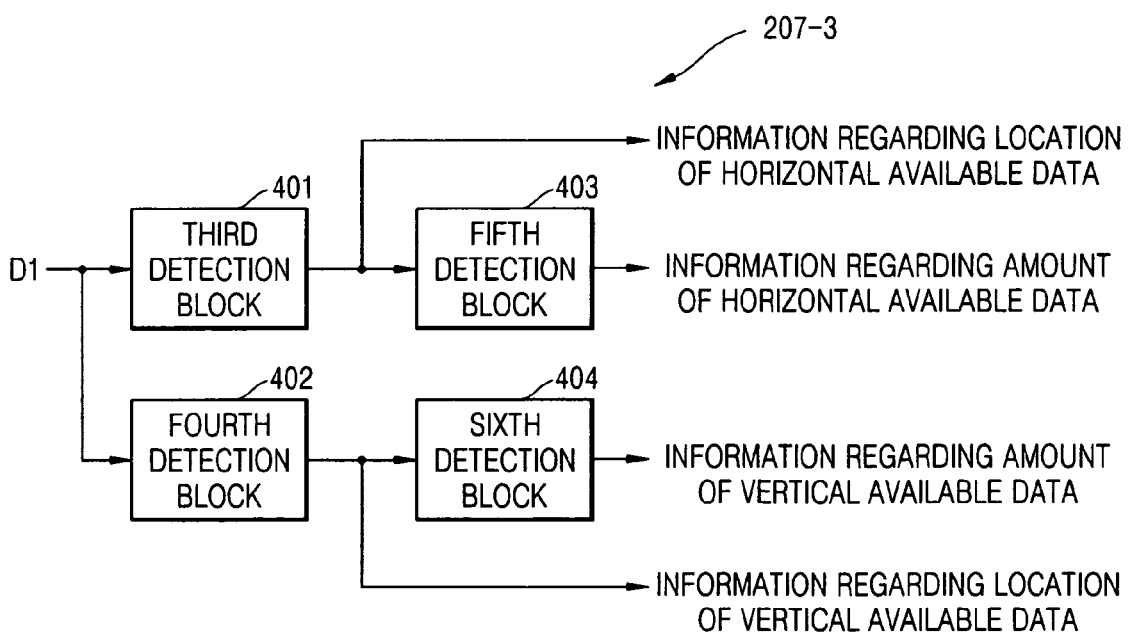
FIG. 4 is a block diagram of a second detector of the apparatus of FIG. 2, in accordance with the present invention.

FIG. 4 is a block diagram of the second detector 207-3.

Referring to FIG. 4, the second detector 207-3 includes a third detection block 401, a fourth detection block 402, a fifth detection block 403, and a sixth detection block 404.

The third detection block 401 detects a start location and an end location of the horizontal available data. The fourth detection block 402 detects a start location and an end location of the vertical available data. The fifth detection block 403 subtracts the start location of the horizontal available data from the end location of the horizontal available data, thus determines the amount of the horizontal available data. The sixth detection block 404 subtracts the start location of the vertical available data from the end location of the vertical available data, thus determining the amount of the vertical available data.

The third detection unit 207-5 detects minimum and maximum gray levels for the horizontal and vertical available data.

FIG. 5 shows an initial field (or initial frame) of the digital data signal D1 output from the ADC-PLL 201, in matrix form.

Referring to FIG. 5, figures denoted in the matrix are decimal values of digital data converted by the ADC. Here, figures listed in a single column to the left of the matrix represent pixel numbers and figures listed in a row above the matrix represent line numbers.

When an analog signal is converted to a digital signal using a sampling clock signal, a digital data signal D1 output from the ADC includes noise components if the frequency and phase of the sampling clock signal are not equal to those of the analog signal. The noise components appear as bands on a picture and correspond to a frequency difference between the sampling clock signal and the analog signal.

If, for example, the number of sampled data is 1680 when the frequency of the sampling clock signal is exactly equal to that of the analog signal, if the number of generated data is 1677 due to a frequency mismatch between the sampling clock signal and the analog signal, three noise bands will appear on the panel.

FIGS. 6A through 6D illustrate noise bands displayed on a panel and corresponding noise patterns.

Figure 6:
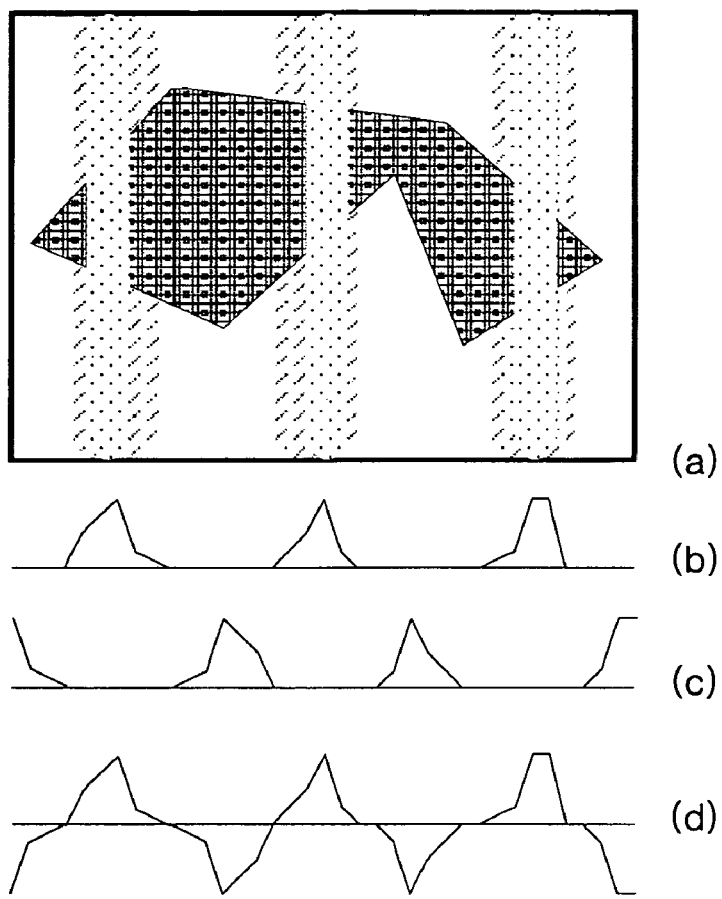
FIG. 6 illustrates noise bands displayed on a panel and corresponding noise patterns, in accordance with the present invention.

FIG. 6A illustrates a noise band generated when the frequency of a sampling clock signal is not equal to an input analog signal An aspect of the present invention is the advanced sensing of such a phenomenon as that illustrated in FIG. 6A and automatic changing of the phase of a sampling clock signal according to the sensed information. According to an embodiment of the present invention, if three noise bands appear on a picture as shown in FIG. 6A, a phase is calculated on the basis of the three noise bands and the phase of the sampling clock signal is changed to the calculated phase.

FIG. 6B is a signal diagram showing accumulated noise generated as output data of the noise accumulation block 302 when the noise bands shown in FIG. 6A appear.

The accumulated noise is obtained by calculating the difference between a current frame and a next frame under the assumption that no difference exists between the two frames. For the convenience of description, it is assumed that a first frame (picture) includes no noise and the noise bands shown in FIG. 6A appear in a second frame. FIG. 6B corresponds to a difference between pixel values of the first and second frames at the same location. Since clear regions in the second frame pixel data are not different with the first frame pixel data, the difference can be converted to 0 (zero). Referring to FIG. 6B, greater differences occur in regions where the noise bands appear.

FIG. 6C is a signal diagram showing accumulated noise generated as output data of the noise accumulation block 302 when the phase of the sampling clock signal is shifted by 180° under the same conditions that produce FIG. 6A.

Referring to FIG. 6C, since a sampling location changes when the phase of the sampling clock signal is shifted by 180°, noise components are accumulated in the regions where no noise band appears.

FIG. 6D shows an accumulated noise pattern generated using the noise patterns of FIGS. 6B and 6C.

Referring to FIG. 6D, a constant waveform is produced.

The kernel generator block 304 generates a kernel signal K and the signal K is used to detect the frequency and phase of the sampling clock signal with the accumulated noise pattern shown in FIG. 6D.

The second detection block 305 calculates inner products of a plurality of kernel signals K created by the kernel generator block 304 and the noise pattern (FIG. 6D) generated by the noise generation block 302. After the inner products are calculated, an optimal phase value is selected in consideration of a kernel signal value with a greatest inner product with the noise pattern and the determined optimal phase value is output.

Figure 7:
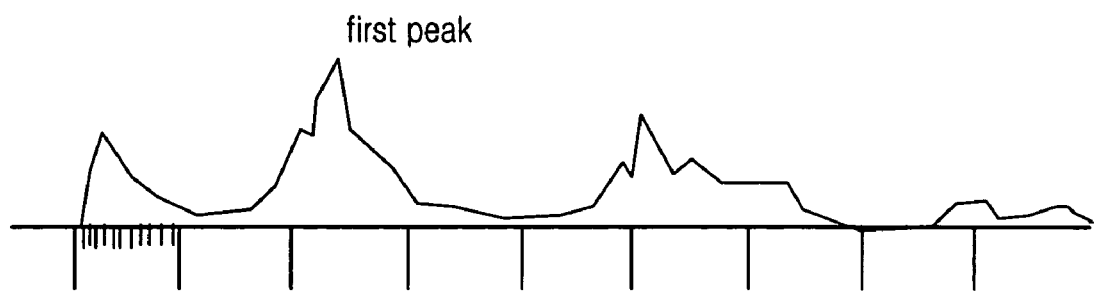
FIG. 7 is a signal diagram showing an inner product of a kernel and a accumulated noise pattern shown in FIG. 6, in accordance with the present invention.

FIG. 7 is a signal diagram showing the inner products of the kernel signals and the accumulated noise pattern.

A peak value of the inner products of the accumulated noise pattern and the kernel signals shown in FIG. 7 are used to obtain a frequency and a phase of an ADC sampling clock signal.

As described above, in a display state control apparatus and method according to the present invention, it is possible to maintain an optimal display state by automatically changing the frequency and phase of a sampling clock signal used to sample an input signal according to changes in the input signal. In this manner, user interaction is not required for generating the optimal display control signal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling a display state, comprising:
   an Analog to Digital Converter-Phase Locked Loop (ADC-PLL) that converts a received analog signal into a digital data signal using an internal sampling clock signal and outputting the digital data signal, in response to a first control signal and a second control signal;
   a digital signal processor that performs scaling, gamma correction, and dithering on the digital data signal in response to a third control signal;
   an auto control unit that detects the frequency and the phase of the sampling clock signal, the locations and amounts of horizontal and vertical available data included in the digital data signal, and the minimum and maximum gray levels of the horizontal and vertical available data of the digital data signal using the digital data signal; and
   a controller that outputs the first control signal, the second control signal, and the third control signal using information detected by the auto control unit, wherein the auto control unit comprises:
      a first detector that detects the frequency and the phase of the sampling clock signal using the digital data signal;
      a second detector that detects the locations and amounts of the horizontal and vertical available data included in the digital data signal; and
      a third detector that detects the minimum and maximum gray levels of the horizontal and vertical available data included in the digital data signal, wherein the first detector comprises:
         a first detection block that detects the location of a pixel with the maximum high-frequency among pixels arranged in a column direction;
         a noise accumulation block that accumulates field or frame data at the location of the pixel with the maximum high-frequency;
         a memory that stores data detected by the first detection block and data to be accumulated by the noise accumulation block;
         a kernel generator block that generates a kernel signal for detecting the location of accumulated noise; and
         a second detection block that detects the frequency and the phase of the sampling clock signal using the accumulated field or frame data and the kernel signal.

2. The apparatus of claim 1, wherein the ADC-PLL comprises an ADC (Analog to Digital Converter) and a PLL (Phase Locked Loop circuit), and wherein the PLL generates a sampling clock signal the frequency and phase of which change in response to the first control signal, and wherein the ADC adjusts the gain of the digital data signal when converting the received analog signal into the digital data signal in response to the second control signal.

3. The apparatus of claim 1, wherein,
   the first control signal is generated using output data of the first detector and the second detector and is used to change the frequency and the phase of the sampling clock signal,
   the second control signal is generated using output data of the third detector, and
   the third control signal is generated using output data of the second detector and is used by the digital signal processor to control scaling, gamma correction, and dithering.

4. The apparatus of claim 1, wherein the second detector comprises:
   a third detection block that detects the start location and the end location of horizontal available data included in the digital data signal;
   a fourth detection block that detects the start location and the end location of vertical available data included in the digital data signal;
   a fifth detection block that detects the amount of the horizontal available data by subtracting the start location of the horizontal available data from the end location of the horizontal available data; and
   a sixth detection block that detects the amount of the vertical available data by subtracting the start location of the vertical available data from the end location of the vertical available data.

5. The apparatus of claim 1, wherein the analog signal is a graphics data signal or a video data signal.

6. A method for controlling a display state implemented by a display device, comprising:
   generating, by the display device, a sampling clock signal in response to a second control signal, and converting a received analog signal into a digital data signal using the sampling clock signal and simultaneously controlling the gain of the digital data signal in response to a first control signal;
   performing, by the display device, digital signal processing, including at least one of scaling, gamma correction, and dithering, on the digital data signal in response to a third control signal;
   generating, by the display device, a detection signal for controlling the frequency and phase of the sampling clock signal and for controlling the digital signal processing, using the digital data signal; and
   generating the first control signal, the second control signal and the third control signal using the detection signal,
   wherein the generating of the detection signal comprises:
      detecting the frequency and phase of the sampling clock signal using the digital data signal;
      detecting the locations and amounts of horizontal and vertical available data included in the digital data signal; and
      detecting the maximum and minimum gray levels of the horizontal and vertical available data included in the digital data signal,
   wherein the detecting of the frequency and the phase of the sampling clock signal comprises:
      detecting the location of a pixel with a maximum high-frequency among pixels arranged in a column direction;
      accumulating field or frame data at the location of the pixel having the maximum high-frequency;
      storing in a memory data detected during the detecting of the location of the pixel and the data accumulated during the accumulating of the field or frame data;
      generating a kernel signal for detecting the location of accumulated noise; and
      detecting the frequency and phase of the sampling clock signal using the accumulated field or frame data and the kernel signal.

7. The method of claim 6, wherein the detecting of the locations and amounts of the horizontal and vertical available data comprises:
   detecting the start location and the end location of the horizontal available data included in the digital data signal;

detecting the start location and the end location of the vertical available data included in the digital data signal;

subtracting the start location of the horizontal available data from the end location of the horizontal available data, thereby detecting the amount of the horizontal available data; and subtracting the start location of the vertical available data from the end location of the vertical available data, thereby detecting the amount of the vertical available data.

* * * * *

UNITED STATES PATENT AND TRADEMARK OFFICE
CERTIFICATE OF CORRECTION

PATENT NO. : 7,633,494 B2 Page 1 of 1
APPLICATION NO. : 11/267803
DATED : December 15, 2009
INVENTOR(S) : Woon Na It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Ninth Day of November, 2010

David J. Kappos
*Director of the United States Patent and Trademark Office*